US 008495146B2

(12) United States Patent
Murphy, Jr. et al.

(10) Patent No.: US 8,495,146 B2
(45) Date of Patent: Jul. 23, 2013

(54) SOURCE INITIATED AUTONOMIC RECIPIENT E-MAIL ADDRESS CORRECTION REDISTRIBUTION

(75) Inventors: Thomas E. Murphy, Jr., Hopewell Junction, NY (US); Francis A. Pflug, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/463,340

(22) Filed: Aug. 9, 2006

(65) Prior Publication Data

US 2008/0040432 A1 Feb. 14, 2008

(51) Int. Cl.
G06F 15/16 (2006.01)

(52) U.S. Cl.
USPC ............ 709/206; 709/203; 709/204; 709/205

(58) Field of Classification Search
USPC .......................................................... 709/206
See application file for complete search history.

(56) References Cited

U.S. PATENT DOCUMENTS

| | | | | |
|---|---|---|---|---|
| 6,564,264 | B1 * | 5/2003 | Creswell et al. | 709/245 |
| 7,136,898 | B1 * | 11/2006 | Chisaki et al. | 709/206 |
| 7,149,780 | B2 * | 12/2006 | Quine et al. | 709/206 |
| 7,194,484 | B2 * | 3/2007 | Aoki | 1/1 |
| 7,472,164 | B2 * | 12/2008 | Singer | 709/206 |
| 2002/0023138 | A1 * | 2/2002 | Quine et al. | 709/206 |
| 2002/0103932 | A1 * | 8/2002 | Bilbrey et al. | 709/245 |
| 2003/0018722 | A1 * | 1/2003 | Almeda et al. | 709/206 |
| 2003/0101226 | A1 | 5/2003 | Quine | 709/206 |
| 2003/0115279 | A1 | 6/2003 | Quine et al. | 709/207 |
| 2004/0158612 | A1 * | 8/2004 | Concannon | 709/206 |
| 2004/0221012 | A1 * | 11/2004 | Heumesser | 709/206 |
| 2005/0188024 | A1 * | 8/2005 | Singer | 709/206 |
| 2005/0188031 | A1 * | 8/2005 | Zandt | 709/206 |
| 2006/0031359 | A1 * | 2/2006 | Clegg et al. | 709/206 |
| 2006/0190830 | A1 * | 8/2006 | Gerstl et al. | 715/757 |
| 2007/0078934 | A1 * | 4/2007 | Gardner | 709/206 |
| 2007/0106731 | A1 * | 5/2007 | Bhakta et al. | 709/206 |
| 2008/0040432 | A1 * | 2/2008 | Murphy et al. | 709/206 |

FOREIGN PATENT DOCUMENTS

| | | |
|---|---|---|
| JP | 06-037802 | 2/1994 |
| JP | 11-175427 | 7/1999 |
| JP | 2003-178000 | 6/2003 |
| JP | 2004-139280 | 5/2004 |

OTHER PUBLICATIONS

IBM Technical Disclosure Bulletin, vol. 36, No. 1, Jan. 1993, pp. 70-72 entitled "Mail Address Change Notification" by D. Clark et al.
IBM Technical Disclosure Bulletin, vol. 36, No. 10, Oct. 1992, p. 211 entitled "Automatic Addressee Fuzzy Search".

* cited by examiner

Primary Examiner — Firmin Backer
Assistant Examiner — Keyvan Emdadi
(74) Attorney, Agent, or Firm — Cantor Colburn LLP; William A. Kinnaman, Jr.

(57) ABSTRACT

A computer system and associated method is disclosed for distributing electronic communication. The electronic communication is originated from a first originating destination and is to be sent to a distribution of recipient(s). The distribution can simply consist of one or a plurality of intended recipients. When delivery information is verified, any errors leading to delivery failure of the communication is corrected to be used in subsequent response communication originated by one or more of these recipients.

20 Claims, 3 Drawing Sheets

Delivery Failure Report

Your document.        Example of Incorrectly addressed Email to one of several recipients.
was not delivered to.  <wrong_id@charter.net> because.              Message delivery has failed for an unknown reason.

What should you do?
- You can resend the undeliverable document to the recipients listed above by choosing the Resend button or the Resend command on the Actions menu
- Once you have resent the document you may delete this Delivery Failure Report.
- If resending the document is not successful you will receive a new failure report.
- Unless you receive other Delivery Failure Reports, the document was successfully delivered to all other recipients.

▸ Routing path

110   To:   wrong_id@charter.net
120   cc:   Thomas Murphy Jr/Endicott/IBM@IBMUS, Francis Pflug/Endicott/IBM@IBMUS
      Date: 11:32:47 AM Today
      Subject: Example of Incorrectly addressed Email to one of several recipients

SOURCE INITIATED AUTONOMIC RECIPIENT E-MAIL ADDRESS CORRECTION REDISTRIBUTION

BACKGROUND OF THE INVENTION

1. Field of the Invention

This invention relates to a method and system for sending electronic mail and more particularly for a method and system for correction of electronic mail addresses.

2. Description of Background

In recent years, electronic communication has become a preferred medium of communication for many businesses and individuals. The preference stems from the many advantages that are provided by this mode of communication. People have always wanted to correspond with one another in the fastest way possible. Electronic mail, also known as email or e-mail, is advantageous over regular mail in this respect as it provides a near instantaneous form of communication. Prior to e-mail, first telegraph, and then later facsimile provided similar instantaneous forms of communication but in both instances the steps leading to sending and then ultimately steps involved in receiving this instant communication were burdensome. By contrast, once means of communication is established, electronic mail does not provide any additional burdens either for the sender or the receiver of the mail in sending and/or receiving it.

In many instances, e-mail is even taking the place of telephone or is even preferred to it. While affording the same ease and instantaneous means of communication as a telephone, electronic communication is preferred in instances where there is an advantage to recording the communication. For example documentation of communications may be required or at least preferred in instances where such documentation provides legal protection to one or both parties. But even in situations where such documentation is not necessary, written documentation affords better information retention. For example, it may be easier to organize and retain information about a client's new address and phone number when such information is provided by stored electronic means that can be easily retrieved as opposed to other means that can be more easily misplaced.

The popularity of e-mail has led both individuals and businesses to rely heavily on this form of communication. E-mail allows people to write back and forth without having to spend much time worrying about how the message actually gets delivered. As technology grows closer and closer to being a common part of daily life, the reliance of both individuals and businesses on this medium of communication is sharply increasing. The concept of electronic mail is founded in the concept of an address. An e-mail address provides all of the information required to get a message to any other user or businesses anywhere around the world.

Due to the instantaneous and mostly reliable nature of this communication, often times once the e-mail is sent, the user assumes the necessary information has been disseminated. Unfortunately, however, there are instances where the message contained in the e-mail cannot be delivered for a number of reasons to the intended recipient. In such instances, the message sender often is not informed about delivery difficulties until much later. By then, the sender may have gone on to accomplish other tasks or may no longer be available for sometime. This, unfortunately, can create problems both for the sender and the intended receiver(s) of such information that have placed importance in fast delivery of such information.

In addition, the delivery error message (if sent), is typically only sent to the actual originator of the communication. Therefore, none of the successfully addressed recipients of the communication will be notified of the occurrence of an error until attempting to initiate subsequently responses to the original message that often use the same distribution lists of recipients having the same embedded incorrect information. As more and more users get involved and more responses are generated, the error further compounds as it is duplicated each time, leading to the cascading of incorrect e-mail addresses and information that were originated from an earlier stage from a single source.

The error and associated lost productivity become a permanent attribute in any later communication that uses the erroneous email address or addresses. There are no adequate solutions in prior art that currently address this problem. Consequently, it would be desirous to implement a technique where such cascading of error can be minimized or eliminated.

SUMMARY OF THE INVENTION

The shortcomings of the prior art are overcome and additional advantages are provided through the provided computer system and associated method for distributing electronic communication. The electronic communication is originated from a first originating destination and is to be sent to a distribution of recipient(s). The distribution can simply consist of one or a plurality of intended recipients. When delivery information is verified, any errors leading to delivery failure of the communication is corrected to be used in subsequent response communication originated by one or more of these recipients. In different embodiments of the present invention, error correction and its distribution to the intended recipients can made automatically or customized to depend on a number of factors.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a snap shot illustration of a delivery failure message returned to an originator of an electronic communication;

DESCRIPTION OF THE INVENTION

Figure 2:
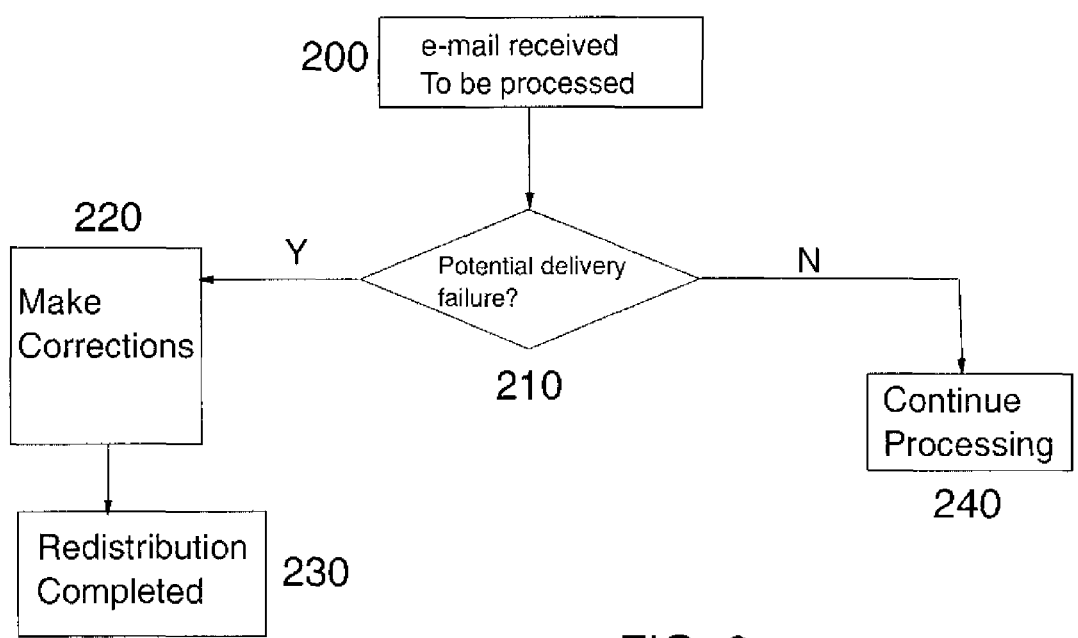
FIG. 2 is a flow chart illustration of a process flow of one of the embodiments of the present invention.

FIG. 1 provides a snap-shot of a delivery failure report (referenced as 100) generated when an electronic communication such as mail (e-mail) has failed to see its intended recipient. The snap-shot and the discussion that follows use IBM Corporation's "Lotus Notes" product as an example of an electronic communication delivery service. This is done entirely as way of an example to ease understanding and therefore the teaching of the present invention should not be considered limited to the use of Lotus Notes. As will be discussed, most electronic communication and particularly e-mail delivery systems, operate on similar concepts and therefore experience the same limitations and problems as will be explored in conjunction with the discussion pertaining to Lotus Notes. Similarly, the concepts suggested by the present invention, are applicable to all such e-mail services and are not unique to the concepts discussed in conjunction with Lotus Notes.

In FIG. 1, as illustrated the mail containing the attempted message was sent by the originator of the e-mail, hereinafter referenced as the originator. The message was intended primarily for "wrong-id" whose correct e-mail domain address was at "charter.net" in this example. This information can be obtained by referencing the "TO" field denoted by numerals 110. In this example, "wrong_id" encompasses any and all types of underliverable destination id's. (eg. misspelled, non-existent, miss-typed or otherwise wrongly entered user identity, etc . . . )

A list of other names also appear in the carbon copy distribution section, denoted by "cc" and referenced by numerals 120. These other field illustrate that the e-mail was also sent, as way of carbon copying, to a (user id) Thomas Murphy Jr. at Endicott whose e-mail address is at IBMUS and to a second person, namely a Francis Pflug at Endicott whose e-mail address is also at IBMUS.

The "Delivery Failure Report" 100 as illustrated in FIG. 1 often only is delivered back to the originator of the message alone. The correctly addressed recipients, in this case Thomas Murphy Jr. and Francis Pflug, who are only carbon copied here do not receive or in any shape see the "Delivery Failure Report" 100 that is sent back to the originator of the message. It should be noted that this is the case no matter what field the name of the correctly addressed recipients appear in. That is to say that even though, in the example used the names of Thomas Murphy Jr. and Francis Pflug, happens to appear in the "cc" field, there names could have easily appeared in the "To" filed 120 or alternatively on a blind carbon copy (bcc) list (not illustrated here) or any other kind of fields that may appear in conjunction with a particular e-mail delivery service. The end result would be the same and the originator of the e-mail would be the only person who would get the "Delivery Failure report" with none of the correctly addressed recipients, included in any of the fields mentioned above, not being notified that any such delivery error was made.

Similarly, it does not matter which field the erroneous name or the name with the erroneous e-mail address appears in. In the example of FIG. 1, the erroneous name/address was that of "wrong-id" and that name appeared in the "To" field. In this case, the "wrong-id" was the primary party the message was intended for, with everyone else being only on the copy list. The same resultant (error notification), however, would have occurred if the name of the 'wrong-id' was one of many possible names that occurred in the "bcc" field 120, along with everyone else's name and address in the same field provided with correct userid@address information. Alternatively, the name of the 'wrong-id' could have been one of the names appearing in the "bcc" 130 field or other such fields, such as a "bc" or other similar fields that are not illustrated here. The name of the "wrong-id" might be the only name providing incorrect information, or it could be one of a few or many names with incorrect provided information.

In any such cases, the result would be the same as already discussed above. The originator of the message would be the only one that would get the "Delivery Failure Report" 100 of FIG. 1, and the remaining individuals (or entities) on the e-mail list will not be informed that a delivery error has occurred at all. If there are more than one delivery problem because of incorrect information provided on more than one entry, then a single "Delivery Failure Report" or many, with each indicating a single error, may be generated and sent to the originator depending on the particular e-mail system being used.

The thought, process, perhaps behind the design of many such e-mail systems and services where the delivery failure is only reported to the originator makes much sense. It is logical to assume that the delivery of the e-mail is the responsibility of the originator of the mail and the other e-mail recipients do not want to be bothered by the delivery or lack of the delivery of the original message. This problem can become increasingly more troublesome after a few iterations. While perhaps the first time that such an error surfaces as the result of the originator's erroneous address information, the error reporting may not be troublesome, if such an error is not corrected but simply duplicated, other error reports are generated and sent to all recipients included in the distribution list. As the problem cascades, the impact grows exponentially, with the situation leading to unnecessary cluttering of the systems and other individuals mail.

The problem, often, occurs, in a practical setting and even though originally the other recipients of the e-mail may not want to find out about the lack of delivery to one or more persons/entities stated on the originator's message they will come to care about it as the responses from them and other such recipients start to appear. In other words, when any of the correctly addressed recipients in the distribution receive the mail in their respective inboxes and choose to "reply (or forward) to all" originally listed persons/entities in the originator's distribution list (including the malformed addressee), by simply choosing a "Reply(or Forward) All" option included with many e-mail systems or by actual cutting and pasting or formation of a new distribution list based on what was sent that automatically handles such situations.

In all such cases, the person responding will logically make the assumption that all recipient addresses were correct, whereas in fact one or more of the recipients, in this case the primary recipient has perhaps never received the original e-mail. In this manner the problem cascades, and each time that the message is distributed further (and perhaps new persons/entities are even added), the problem duplicates itself. This is because no matter which method is used, the cutting and pasting, the retyping or using of the "Reply/Forward ALL" or other automated systems that duplicate the distribution list, the information is not corrected but is only duplicated from the original list.

In a different scenario, the originator or initiator of the communication is trying to schedule a meeting using both the e-mail and the calendaring option to find a suitable lime and then sending the invitation to a group of individuals as per a user generated distribution list. The challenge will be similarly faced here by a source/initiator of this meeting notice in case a meeting time or location change is required subsequent to the initial meeting notice distribution. In this example, subsequent meeting record modifications are propagated to the meeting invitees in the distribution list. Depending on enterprise/user policies & preferences, when the recipients process the meeting invitations or updates, the later versions are reconciled by the mail client and the recipient is offered the opportunity to open the latest aggregated meeting record. Again a delivery failure will not be sent to all invited persons on the distribution list, in case of information error, but only to the originator of the meeting. However, a change request or even a counter offer will use the distribution list to generate later mail that will be resent to everyone on the list, thus cascading the error.

This latter example is used to reflect that delivery problems discussed in conjunction with FIG. 1, can have much more encompassing effects and is not limited to e-mail delivery alone. Other similar problems an also arise of this situation, as known to those skilled in the art, that will not be discussed here in detail.

Referring back to the original example discussed in conjunction with FIG. 1, in one solution embodiment of the present invention, the originator can be informed of the mis-addressed email and presented an option to make corrections and resend the original email. In one example of such an embodiment an option is provided allowing the originator to provide a corrected email address and resend the undelivered email to the corrected addressee. (This is a common.) In addition, this solution embodiment provides for resending (propagating) the corrected addressee information to the other (original) recipients of the incorrect address as originally sent. In such an example, when the originator receives the typical "Delivery Failure Report" 100, which can be as fast as within seconds of sending the original message, the originator then has the ability of selecting an option, such as "Resend with Propogation" or others providing such similar functions, to avoid a cascading error. The name "Resend with Propogation", obviously is an option name used by way of example here and other similar names or option functionalities may be used. The intent of the option and its function would be to inform the otherwise unaware e-mail clients that are included now or will be somewhat included during a later stage of the distribution, of the original error and the misinformation provided in the primary originated message and tag the correction for the benefit of client software.

In the case of the example provided in conjunction with FIG. 1, this means that Thomas and Francis, who in this case are the unaware e-mail clients, would be informed and the wrong address(es) in the original email distribution would be rectified due to the tagged correction. This may be handled in a variety of manners, as per different embodiments of the present invention, as will be presently discussed that can be less intrusive. Depending on which embodiment of the present invention is selected, any concerns about inundating others (the non-originator of the e-mail or the recipients of an e-mail distribution list) with duplicate and unwanted mail can also be resolved.

It should also be noted that only in one embodiment of the present invention, the originator of the e-mail has the option of actually selecting such a function. In other embodiments, some of which are suggested below, alternate arrangements can be provided to counter the prior art problem discussed.

A first way of handling the resend option is already mentioned. In general, the actual handling of the information could be customized in associated configuration preferences or through a central policy administration. For example, in one embodiment, the handling of such information could be automatic. In such an embodiment, the erroneous e-mail address will be corrected without intervention and appearance in the recipient e-mail box, so in the example above both Thomas and Francis will be completely unaware of the original mistake or any subsequent correction.

In an alternate embodiment, for efficiency reasons, the automatic correction may not be triggered until and unless someone in the distribution list attempts to respond to the person or entity having erroneous information. In such a case, the information is then automatically corrected with or without intervention or with or without appearance to the other recipient's e-mail. An example of this would be using of the "Respond to ALL" or "Reply ALL", (Forward All), etc . . . options included in many e-mail services and/or systems.

There are times, however, that it is not advisable for the mistake to be corrected unnoticed. For example, if one of the persons realizes that the mail should no longer be sent a person if the e-mail has changed. For example, as long as all persons in the distribution list have addresses that belong to company X, the e-mail should be distributed but if the person's address is not one belonging to company X, then the person's name should be taken off of the distribution list. In such a case, an alternate embodiment can be devised. This and other similar examples, provide a reason for necessitating other embodiments that enables customization. In such an embodiment, the correction will be fully exposed in the inboxes of one or more of the persons included in the distribution list for full awareness and/or manual correction. As before, this option can be triggered initially upon the onset of realization or erroneous information (upon sending of the original message), or triggered later when one or more individuals try to respond to the e-mail or other such similar circumstances.

FIG. 2 is a flow chart illustration showing the process flow as per one embodiment of the present invention. As shown at 200, when the e-mail is received at the destination server and retrieved by the destination user's software, preferably user's Client software, the notes are generally catalogued or indexed using a variety of techniques as known by those skilled in the art. In a commonly used method, the cataloguing and/or indexing is performed using a globally unique message identification (message id). The unique message id, is used to allow for the e-mail to be referenced for possible future update and/or reconciliation processing as noted below.

Decision block 210 illustrates the situations the handling of a delivery failure condition. As discussed above, a variety of different embodiments is possible. To ease understanding, an embodiment is discussed where a "resend with propagation" option is used. In the event a delivery failure report is handled with a resend with propagation by the e-mail originator, the original email is referenced to aggregate the redistribution target e-mails with the corrected (originally incorrect) e-mail information and the correction is then redistributed as illustrated at 220. As discussed above, customization and automation of such process both or in combination are possible and a variety of embodiments can be provided during which correction is triggered at different stages of the process. Such processes may involve on one end of the spectrum, the possibility of sending the updates only or at the other end the possibility of resending the full e-mail content. Other embodiments, fall somewhere in between.

Depending on the configuration preferences or policies at the receiving destination or e-mail server and client, the appropriate actions are then taken as previously illustrated at 220. These actions as discussed before can range from dynamically/automatically correcting the incorrect information without any awareness or intervention on the part of the user and or other recipients; or may be such as to provide full awareness. Either way servers/clients at the destination are not effected if they do not support the feature.

In a preferred embodiment of the present invention, header fields may be used to further accommodate the methodology discussed above. The present invention can be used in conjunction with a number of technologies and internet standards currently available. For example, the Network Working Group Request for Comments (RFC) 2822 document, hereinafter RFC2822, from Qualcomm Inc., published April 2001 specifies a syntax for text messages that are sent between computer users, within the framework of e-mail. This standard has been adopted by many e-mail systems and can be used in conjunction with the present invention as well.

In the context of electronic mail, RFC2822 messages are viewed as having an envelope and contents. The envelope contains whatever information is needed to accomplish transmission and delivery. The contents comprise the object to be delivered to the recipient. The above mentioned standard affects the format and some of the semantics of message contents but it does not contain any information pertaining to the envelope. Nonetheless, some message systems may use information from the contents to create the envelope. The standard is intended to facilitate the acquisition of such information by programs.

Under this standard, messages are passed by the help of header fields which have similar structures and are composed of a field name, separated by the field body by a colon. The filed is then terminated by a particular termination key (such as CRLF). There are various type of header fields such as resent header fields that can be used in conjunction with the present invention. Usually, header fields are not guaranteed to be in a particular order and can appear in any order. But resent are not reordered and are must kept in blocks prepended to the message. The only required header fields are the origination date field and the originator address field(s). All other header fields are syntactically optional.

Resent fields are used to identify a message as having been reintroduced into the transport system by a user and their purpose is to have the message appear to the final recipient as if it were sent directly by the original sender. A separate set of resent fields is added each time this is done. All of the resent fields corresponding to a particular resending of a message are lumped together. Each new set of resent fields is prepended to the message such that the most recent set of resent fields appear earlier in the message. Each set of resent fields correspond to a particular resending event such that when a message is resent multiple times, each set of resent fields gives identifying information for each individual time.

There are different types of resent fields such as the "Resent-Date:" field that corresponds to the "Date:" field and the "Resent-To:" field that corresponds to the "To:" field. In addition, there are two forms of originator fields associated with resent fields. The first is a "Resent-From:" form which contains the mailbox of the individual doing the resending. The second is identified in the "Resent-Sender:" field and resends a message on behalf of one or more others (identified in the "Resent-From:" field). When replying to a resent message, replies behave just as they would with any other message, using the original "From:", "Reply-To:", "Message-ID:", and other fields. The "Resent-Date:" indicates the date and time at which the resent message is dispatched by the resender of the message. The "Resent-To:", "Resent-Cc:", and "Resent-Bcc:" fields function identically to the "To:", "Cc:", and "Bcc:" fields respectively, except that they indicate the recipients of the resent message, not the recipients of the original message. The "Resent-Message-ID:" field provides a unique identifier for the resent message. When resent fields are used, the "Resent-From:" and "Resent-Date:" fields are mandatory and must also be sent.

The present invention provides for an industry compliant heterogeneous solution by capitalizing on some of the concepts provided by the resent header fields. The present invention further combines this by also using additional header, parameter fields, and propagation selection to yield a complete solution as per one of its embodiments.

An example of such an embodiment will be presently discussed to ease understanding. Let us assume a case where the client's preferences, or alternatively the present central site policy based configurations, are such that it enables the correction feature discussed earlier to processed the correction automatically. In such a condition, when an e-mail is resent to a distribution of recipients, after detecting a delivery failure and (the originator) having corrected the address using the resent function discussed above, in one embodiment, the original note would be prepended with the resent header fields such that it would cause a re-reference to the original note via the Message-Id field, so as to identity the original note being updated.

A new header line would then be added that carries the original erroneous recipient and the associated (corrected) replacement e-mail address, which is normally coded as a key or type/pair. Some examples of this are can be in following formats:

Updated Recipient: badrecipients=<wronged@charter.net>,

Correctrecipients=<righted@charter.net> or the like.

It should be noted that multiple corrections can be iterated within the same record(s).

In addition, the subject header line could or alternatively should be changed, depending on the particular embodiment, to prepend a string like "Updated Recipient" based on preference, policy or dependent upon the particular embodiment as discussed. This is handled similar to various clients' handling of reply or forward functions, where the subject is automatically prepended (such as with "re"). This manner of handling the header line, will allow the users who don't have a visual User Agent to recognize that a recipient address has been changed so they could manually correct the address. However, when a User Agent is used, they can be utilized to trigger an automatic searching of their mail store for that unique message-id so that when the recipient chooses a reply option, the User Agent could prompt the recipient with a window to correct the erroneous recipient string (or as noted earlier, used to handle it transparently without user intervention.

Figure 3:
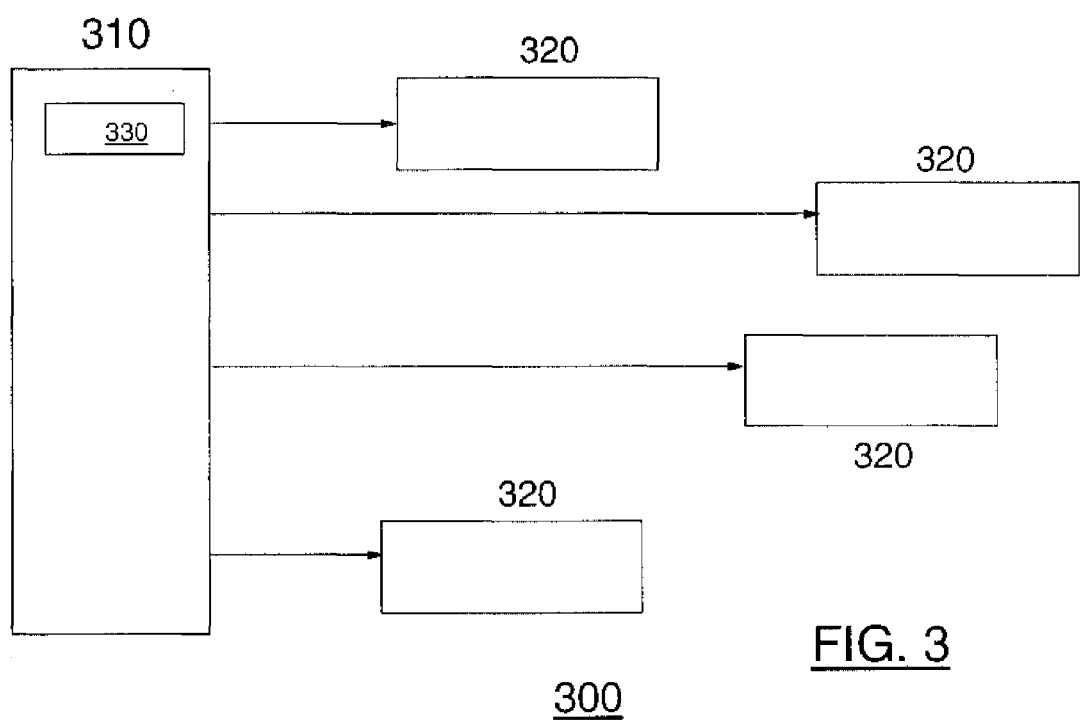
FIG. 3 is a cross sectional depiction of a system where one embodiment of the present invention is implemented.

FIG. 3 is a cross sectional illustration of a sample environment showing an embodiment of the present invention as discussed above. FIG. 3 provides for a network of nodes, referenced generally as 300, that are in processing communication with one another. Any one of the nodes can be the originator of an electronic communication. In this example, the originator node is referenced as 310. The intended communication is to be delivered to a distribution of recipient nodes, referenced in this example, as 320. Once the communication is generated, a variety of header files will be created that includes delivery and transmission information. One such header file is shown and referenced by numerals 330. If the information is included in the header file is erroneous, such that delivery failure to one or more of the recipients is likely, the information in the header file will be corrected, by a variety of ways as discussed earlier and the corrected information will be resent to the distribution of recipients as discussed. The discussion about the variety of customization versus automatic delivery of corrected information remains as discussed earlier, and does not necessitate repeating.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of distributing electronic communication, comprising:
   sending an electronic communication from an originator to a distribution of one or more recipients as specified by delivery information provided in the electronic communication, wherein at least one of the one or more recipients includes wrongly entered user identity information;
   responsive to detecting an error in the delivery information, related to the wrongly entered user identity information, provided in an original electronic communication after it has been sent from the originator, notifying the originator of the error and prompting the originator for corrected delivery information;
   referencing the original electronic communication to aggregate a subsequent electronic communication with the corrected delivery information, the correct delivery information being newly and not previously entered user identity information correcting the wrongly entered user identity information, and entered into the subsequent electronic communication; and
   responsive to receiving corrected delivery information from the originator, distributing the corrected delivery information to one or more of said recipients in the subsequent electronic communication separate from the original electronic communication such that said corrected delivery information can be used in a subsequent response communication originated by one of said recipients,
   wherein said originator selects a customizable option to distribute the corrected delivery information, the customizable option being a resend with propagation option, the propagation option including identifying all recipient of the electronic communication and sending the corrected delivery information to all recipients of the electronic communication,
   wherein said subsequent electronic communication is distributed to one or more of said recipients as if it were sent directly from the originator.

2. The method of claim 1, wherein said distribution includes only one recipient.

3. The method of claim 1, wherein said delivery information includes addressing information.

4. The method of claim 1, wherein corrected delivery information is distributed automatically upon receiving such corrected delivery information from the originator.

5. The method of claim 1, wherein corrected delivery information is distributed only if the originator has selected distribution of corrected delivery information to said distribution of recipients.

6. The method of claim 5, wherein said originator has selected distribution of corrected delivery information through a customized option triggered upon either origination of said original electronic communication or receipt of a potential delivery failure.

7. The method of claim 6, wherein said customized option is a resend with propagation option.

8. The method of claim 1, wherein corrected delivery information is distributed to a recipient of said original electronic communication only if the recipient has previously selected distribution of corrected delivery information.

9. The method of claim 8, wherein said recipient has selected distribution of corrected delivery information through a customized option triggered after an acknowledgement is received informing said recipient of the existence of erroneous delivery information.

10. The method of claim 1, wherein corrected delivery information is only distributed after an onset of a subsequent response communication by one or more of said recipients.

11. The method of claim 10, wherein said corrected delivery information is only provided to an originator of said subsequent response.

12. The method of claim 1, wherein a globally unique message identifier is used to link the original electronic communication to subsequent response communications that may need to use said corrected delivery information.

13. The method of claim 1, wherein each electronic communication includes an envelope having one or more header fields as well as content which includes a message to be communicated.

14. The method of claim 13, wherein said header fields come in different varieties and together hold information regarding delivery and transmission of said electronic communication.

15. The method of claim 14, wherein said header fields include a resent header field.

16. The method of claim 15, further comprising the step of:
   upon detecting a potential delivery problem and receiving corrected delivery information, prepending the original electronic communication with information provided in a resent header field such that said information causes a reference to said original electronic communication so as to identify the original electronic communication being updated.

17. The method of claim 16, wherein a new header line is added carrying information relating to erroneous delivery information as well as associated corrected delivery information, and wherein said reference to said original electronic communication is made through the use of a globally unique identification field.

18. The method of claim 17, wherein a reply option is used and information correction is not triggered automatically.

19. A method of distributing electronic mail, comprising:
   sending an electronic mail communication from an originator at a first location to a distribution of one or more recipients, said electronic mail communication including one or more header fields, said header fields including delivery information needed for transmission and delivery of said electronic mail communication, wherein at least one of the one or more recipients includes wrongly entered user identity information;
   responsive to detecting an error in the delivery information, related to the wrongly entered user identity information, provided in an original electronic mail communication after it has been sent for the originator, notifying the originator of the error and prompting the originator for corrected delivery information;
   referencing the original electronic communication to aggregate a subsequent electronic communication with the corrected delivery information, the correct delivery information being newly and not previously entered user identity information correcting the wrongly entered user identity information, and entered into the subsequent electronic communication;
   responsive to receiving corrected delivery information from the originator, correcting the error in said delivery information and prepending the original electronic mail communication with a resent header field such that it would cause a reference to said original electronic mail communication via a message identification field, said resent header field indicating that said original electronic mail communication is being updated;

generating a new header line in one or more of said header fields as to provide both information relating to said error and information about an associated corrected replacement; and delivering said electronic mail communication and any corrected delivery information to one or more of said recipients in the subsequent electronic mail communication separate from the original electronic mail communication such that said corrected delivery information can be used in a subsequent response communication originated by one of said recipients, wherein said originator selects a customizable option to distribute the corrected delivery information, the customizable option being a resend with propagation option, the propagation option including identifying all recipient of the electronic communication and sending the corrected delivery information to all recipients of the electronic communication, wherein said subsequent electronic communication is distributed to one or more of said recipients as if it were sent directly from the originator.

20. A computer system comprising:

a plurality of nodes in processing communication with one another, each of said nodes being able to generate as an originating node an electronic communication and send the electronic communication to a distribution of one or more recipient nodes, each generated electronic communication having one or more header fields providing delivery information needed for delivery and transmission, wherein at least one of the one or more recipient nodes includes wrongly entered user identity information;

means responsive to detecting an error in the delivery information, related to the wrongly entered user identity information, provided in an original electronic communication after it has been sent from an originating node for notifying the originating node of the error and prompting the originating node for corrected delivery information;

means responsive to referencing the original electronic communication to aggregate a subsequent electronic communication with the corrected delivery information, the correct delivery information being newly and not previously entered user identity information correcting the wrongly entered user identity information, and entered into the subsequent electronic communication; and means responsive to receiving corrected delivery information from the originating node for distributing the corrected delivery information to one or more of said recipient nodes in the subsequent electronic communication separate from the original electronic communication such that said corrected delivery information can be used in a subsequent response communication originated by one of said recipient nodes, wherein said originator selects a customizable option to distribute the corrected delivery information, the customizable option being a resend with propagation option, the propagation option including identifying all recipient of the electronic communication and sending the corrected delivery information to all recipients of the electronic communication, wherein said subsequent electronic communication is distributed to one or more of said recipients as if it were sent directly from the originator.

* * * * *